United States Patent
Furuya et al.

(10) Patent No.: US 8,009,706 B2
(45) Date of Patent: Aug. 30, 2011

(54) FIBER LASER LIGHT SOURCE

(75) Inventors: Hiroyuki Furuya, Osaka (JP);
Kazuhisa Yamamoto, Osaka (JP);
Shinichi Kadowaki, Hyogo (JP);
Masahiro Kashiwagi, Chiba (JP);
Kensuke Shima, Chiba (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/740,498

(22) PCT Filed: Oct. 30, 2008

(86) PCT No.: PCT/JP2008/003114
§ 371 (c)(1),
(2), (4) Date: Apr. 29, 2010

(87) PCT Pub. No.: WO2009/057309
PCT Pub. Date: May 7, 2009

(65) Prior Publication Data
US 2010/0284428 A1 Nov. 11, 2010

(30) Foreign Application Priority Data
Oct. 31, 2007 (JP) .................... 2007-284518

(51) Int. Cl.
*H01S 3/30* (2006.01)
*H01S 3/08* (2006.01)
*H01S 5/00* (2006.01)

(52) U.S. Cl. ................... 372/6; 372/50.11; 372/102

(58) Field of Classification Search ........... 372/6, 50.11, 372/99, 102
See application file for complete search history.

(56) References Cited

U.S. PATENT DOCUMENTS
2003/0156808 A1  8/2003  Sudo et al.

FOREIGN PATENT DOCUMENTS

| | | |
|---|---|---|
| JP | 8-146474 | 6/1996 |
| JP | 2577785 | 11/1996 |
| JP | 2003-86873 | 3/2003 |
| JP | 2003-302547 | 10/2003 |
| JP | 2004-342779 | 12/2004 |
| JP | 2005-174993 | 6/2005 |
| WO | 2007/083452 | 7/2007 |

OTHER PUBLICATIONS

International Search Report issued Dec. 2, 2008 in International (PCT) Application No. PCT/JP2008/003114.
V. Dominic et al., "110W fibre laser", Electronics Letters, Jul. 8, 1999, vol. 35, No. 14, pp. 1158-1160.
M. Ibsen et al., "Broadly tunable DBR fibre laser using sampled fibre Bragg gratings", Electronics Letters, Jan. 5, 1995, vol. 31, No. 1, pp. 37-38.

*Primary Examiner* — Armando Rodriguez
(74) *Attorney, Agent, or Firm* — Wenderoth, Lind & Ponack, L.L.P.

(57) ABSTRACT

A fiber laser light source is provided with a laser resonator including a pair of fiber gratings optically connected to a fiber in a state that the fiber is interposed between the paired fiber gratings. The reflection center wavelength of a laser-exit side fiber grating, out of the paired fiber gratings, lies in a wavelength range where the reflectance of a fiber grating, out of the paired fiber gratings, closer to the pump laser light source is not smaller than 80% but not larger than 98%.

11 Claims, 14 Drawing Sheets

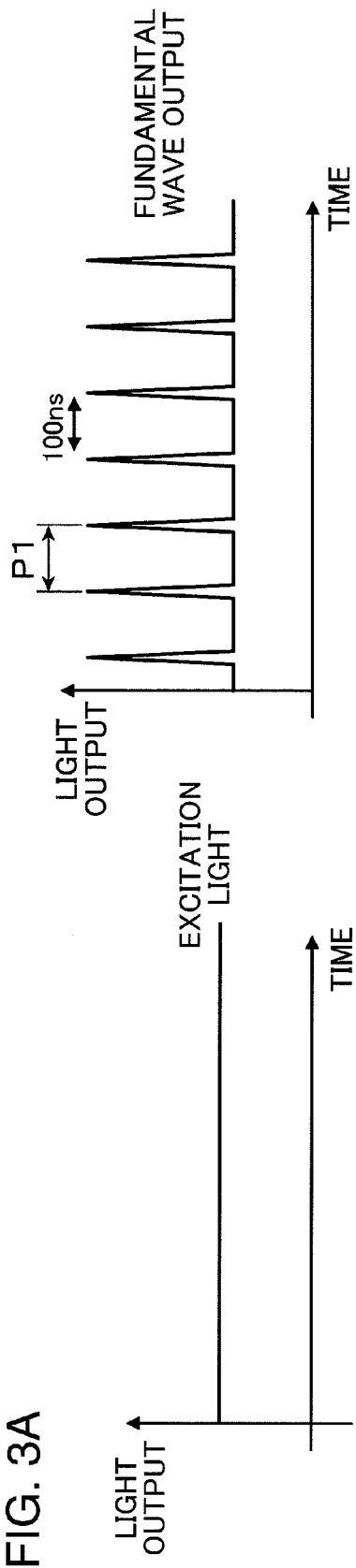
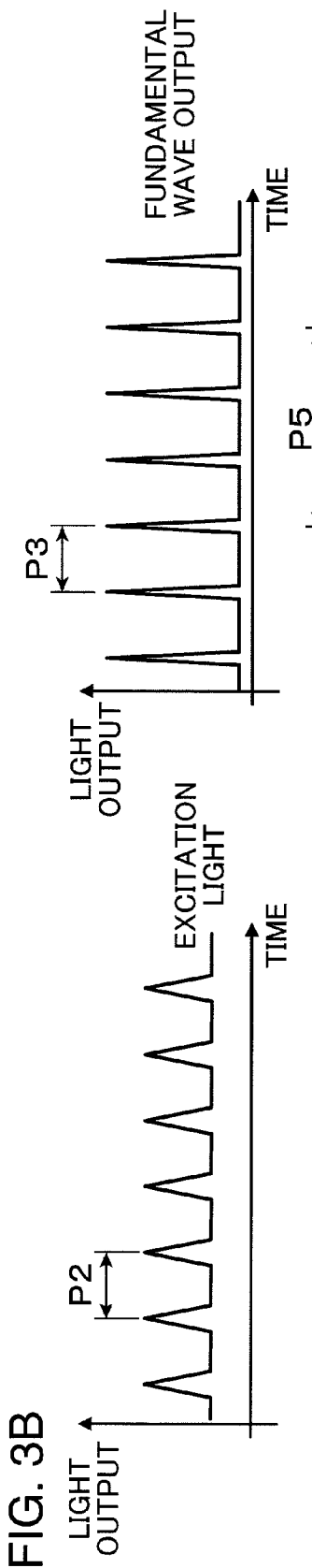
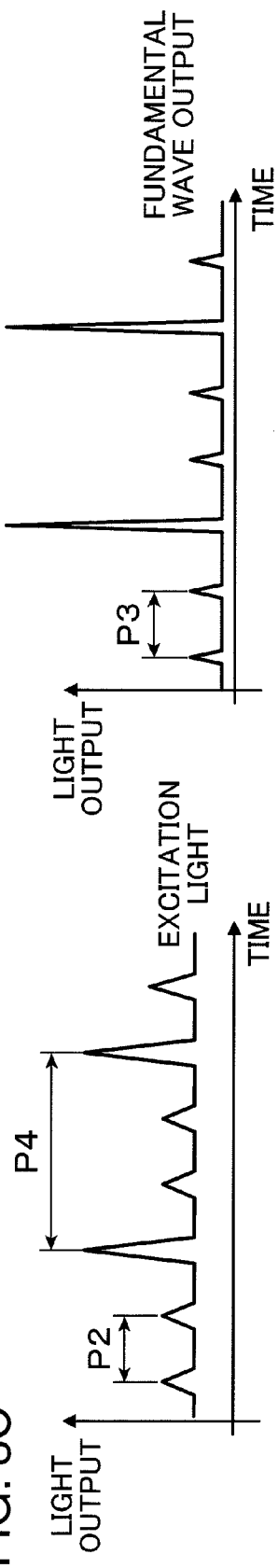
FIG. 3A
FIG. 3B
FIG. 3C

FIG. 7A
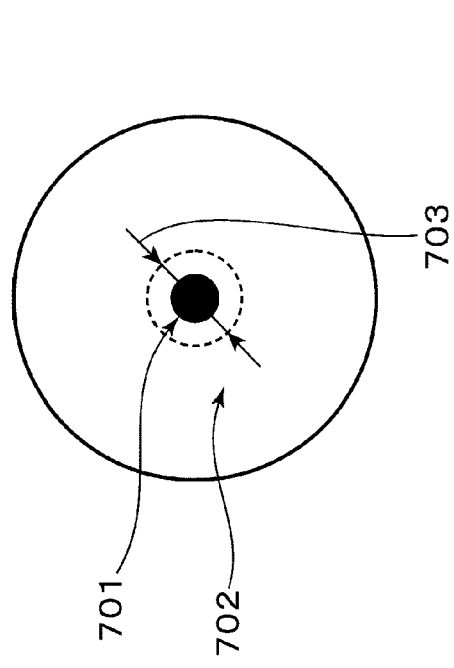
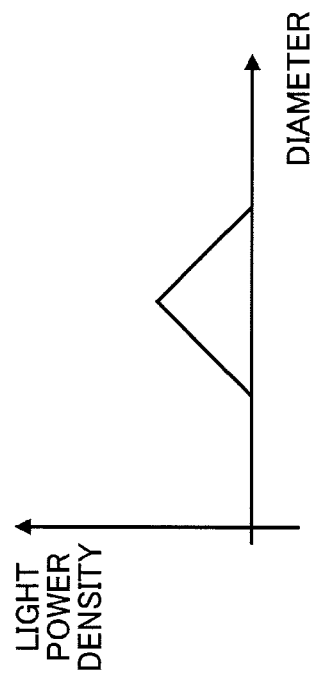
FIG. 7B

FIBER LASER LIGHT SOURCE

TECHNICAL FIELD

The invention relates to a fiber laser light source incorporated with a self oscillation pulse fiber laser.

BACKGROUND ART

Heretofore, there has been primarily used a solid-state laser such as an Nd:YAG laser or an Nd:YVO$_4$ laser, as a laser light source for generating light of a wavelength band of 1 μm. There have been realized a laser processing machine incorporated with the solid-state laser, and a visible light source using light from the solid-state laser as a fundamental wave. However, in case of using a solid-state laser, it is necessary to cool a laser medium, as the output of the solid-state laser is increased, which may resultantly increase the size of the solid-state laser. In view of the above, there has been a demand for a fiber laser light source capable of outputting light of a Watt-class high-output power with a simplified cooling mechanism for the purpose of welding or to obtain a fundamental wave used at a wavelength conversion light source.

Now, a basic laser operation of a fiber laser light source is described. First, pump light from a pump laser light source is entered through an end of a fiber. The incident pump light is absorbed by a laser active material contained in the fiber to thereby generate seed light of a fundamental wave inside the fiber. The seed light of a fundamental wave is repeatedly reflected and reciprocated in a resonator, wherein a fiber grating formed in the fiber, and a fiber grating formed in another fiber constitute a pair of reflection mirrors. Simultaneously with the above operation, a fiber laser is oscillated by amplifying the seed light with a gain derived from the laser active material contained in the fiber to increase the light intensity, followed by wavelength selection. The two fibers are connected to each other by a connecting portion, and the pump laser light source is current-driven by a pump laser current source.

A part of the output light is separated by a beam splitter, received by a light receiving element for monitoring output light, and then converted into an electrical signal for use. An output controller adjusts a drive current for the pump laser light source using a pump laser current source in such a manner that the light intensity is sufficiently increased to obtain an intended output, based on the intensity of the converted electrical signal. Thereby, the intensity of pump light from the pump laser light source is adjusted, and the output intensity of a fundamental wave from the fiber laser is adjusted. This arrangement enables to perform an automatic power control (hereinafter, called as "APC") operation of keeping the intensity of an output from the wavelength conversion device at a constant level.

Configuring a laser light source into a pulse light source having a high peak power expands the usage such as laser processing e.g. boring, and high-efficiency wavelength conversion. However, since a currently available light source having a high peak power is of a continuous oscillation type, the purpose of use is limited to e.g. laser welding. A configuration for amplifying modulated seed light from a seed light source by a fiber amplifier has been primarily used as a configuration for emitting pulse light from a light source incorporated with a fiber.

In addition to the above, in the case where a harmonic is generated from a wavelength conversion device based on a fundamental wave generated from a fiber laser, the conversion efficiency from a fundamental wave to a harmonic can be enhanced by generating pulse-like fundamental wave light having a high peak power, rather than subjecting continuous light to wavelength conversion, if the continuous light and the fundamental wave light have substantially the same average outputs. In other words, emitting pulse light from a fiber laser greatly contributes to enhancing the wavelength conversion efficiency.

The idea of emitting pulse light from a fiber laser has also been studied in the communications field. Specifically, patent literature 1 describes a method, wherein a main resonator and a sub resonator are provided, a light modulator is provided in the resonator, and pulse light is generated by matching the beat phases of the main resonator and the sub resonator by the light modulator. Further, there are disclosed a method (see patent literature 2), wherein narrow-band pulse light is generated by inputting pulse light of a high intensity into an optical fiber having an anomalous dispersion characteristic, and using a frequency shift effect; and a method (see patent literature 3), wherein a saturated absorption effect is imparted to a fiber grating portion of a fiber laser resonator.

In the conventional methods disclosed in patent literatures 1 and 2, it is possible to generate ultra narrow-band pulse light. However, the conventional methods involve a problem that the conversion efficiency of the light source may be deteriorated, because it is necessary to provide a modulator in a resonator, or the excitation efficiency is lowered. Even if a saturated absorption band is provided in a resonator, as disclosed in patent literature 3, the conversion efficiency may be lowered, because light loss in the resonator is increased. Further, in all of the arrangements disclosed in patent literatures 1 through 3, a part is required in addition to the elements constituting a fiber laser resonator for generating continuous light, which may increase the cost.

Patent literature 1: Japanese Patent No. 2577785
Patent literature 2: JP Hei 8-146474A
Patent literature 3: JP 2005-174993A

SUMMARY OF THE INVENTION

In view of the above, an object of the invention is to provide a fiber laser light source that enables to emit pulse light without adding a part.

A fiber laser light source according to an aspect of the invention includes a fiber containing a laser active material; a pump laser light source which emits pump light into the fiber; and a laser resonator including a pair of fiber gratings optically connected to the fiber in a state that the fiber containing the laser active material is interposed between the paired fiber gratings, wherein the laser resonator is configured to emit light of a single polarization by a polarization maintaining fiber and a single polarization mechanism, and a reflection center wavelength of a laser-exit side fiber grating, out of the paired fiber gratings, lies in a wavelength range, where a reflectance of a fiber grating, out of the paired fiber gratings, closer to the pump laser light source is not smaller than 80% but not larger than 98%.

According to the invention, a self oscillation laser can be realized by changing the refractive index of one of the fiber gratings, and changing an overlap portion of reflection bands of the fiber gratings.

BRIEF DESCRIPTION OF THE DRAWINGS

FIGS. 3A through 3C are plot diagrams each showing a relation between a waveform of an output of pump light, and a waveform of an output of a fundamental wave corresponding to the pump light, in a second embodiment of the invention.

FIGS. 7A and 7B are plot diagrams showing that the mode field diameter of light passing through a fiber constituted of a fiber grating having a wide wavelength band and closer to a pump laser light source in a fifth embodiment of the invention is increased.

BEST MODE FOR CARRYING OUT THE INVENTION

Figure 1:
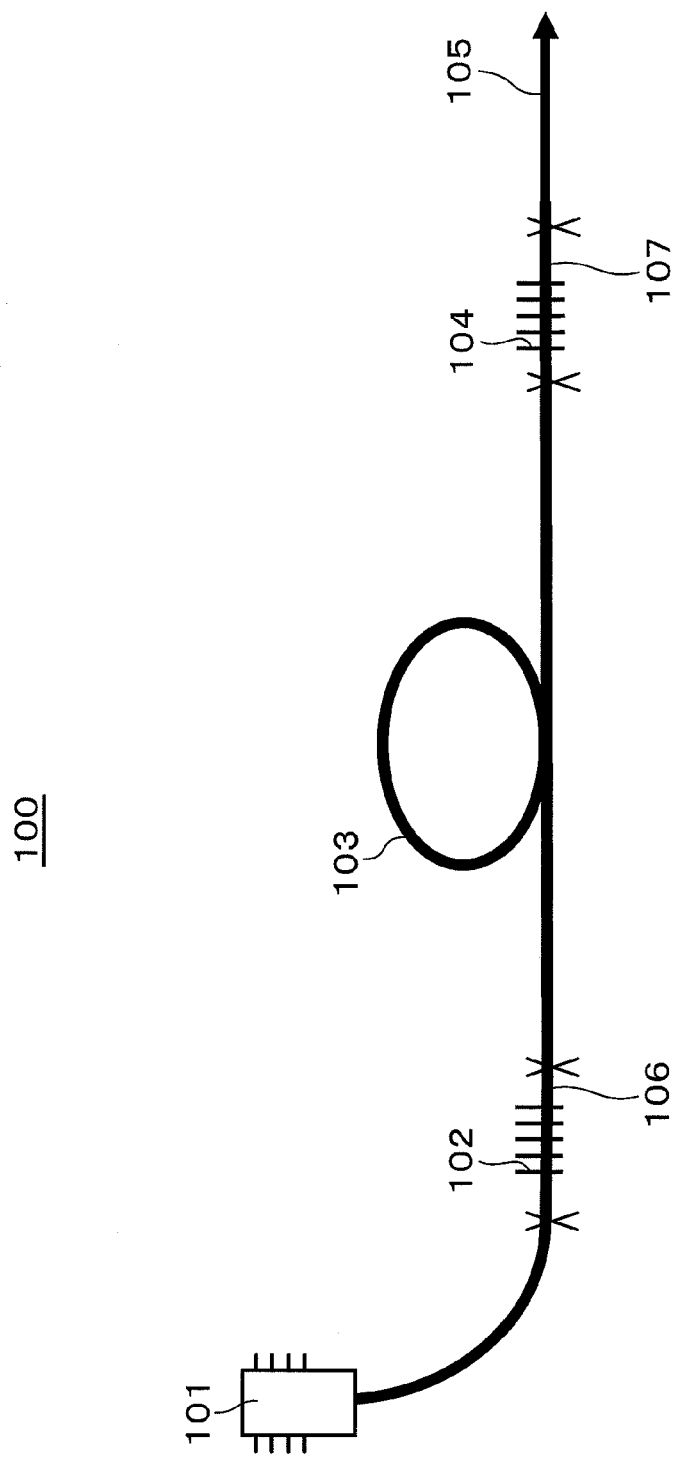
FIG. 1 is a construction diagram of a fiber laser light source in a first embodiment of the invention.

In the following, embodiments of the invention are described referring to the accompanying drawings. The following embodiments are merely some examples embodying the invention, and do not limit the technical scope of the invention. Repeated description on the elements with like reference numerals throughout the drawings may be omitted, as necessary.

First Embodiment

FIG. 1 shows an example of the embodiment. A fiber laser light source 100 includes a double clad polarization maintaining fiber 103 (in this embodiment, the fiber length is set to 10 m) doped with Yb as a rare earth element into a core portion, a pumping LD 101 which emits pump light into the fiber 103, and a laser resonator including a pair of fiber gratings 102 and 104 optically connected to the fiber 103 in a state that the fiber 103 is interposed between the paired fiber gratings 102 and 104.

The fiber laser light source 100 is constructed in such a manner that the fiber 103 is excited (pumped) by the pumping LD 101 to emit laser light (a fundamental wave) within a resonator constituted of the paired fiber gratings 102 and 104. Since a Yb-doped double clad polarization maintaining fiber is used as the fiber 103, it is possible to emit light of a wavelength of not smaller than 1,050 nm but not larger than 1,170 nm, as necessary, by controlling the characteristics of the fiber gratings. Thus, the fiber laser light source 100 is usable for e.g. laser processing, or as a wavelength conversion light source. In view of the above, Yb is selected as a laser active material for the fiber 103.

In this embodiment, single-emitter laser diodes (three diodes each having a maximum output of 8 W) having an oscillation wavelength of 975 nm are used as the pumping LD 101. The fiber grating 102 is formed in a core portion of a double clad polarization maintaining fiber 106 having an improved sensitivity with respect to ultraviolet light by doping germanium; and has a characteristic that the center wavelength is 1,064 nm, the reflection spectral bandwidth is 1 nm (full width at half maximum; FWHM), and the reflectance is 98%. The fiber grating 104 is formed in a core portion of a general germanium-doped single-mode polarization maintaining fiber 107 (core diameter: 6 μm, outer size of a clad portion: 125 μm), and has a characteristic that the center wavelength is 1064 nm, the reflection spectral bandwidth is 0.05 nm (FWHM), and the reflectance is not smaller than 10% but not larger than 15%. In view of the conversion efficiency into visible light within a wavelength conversion module, in the case where light from the fiber is used as a fundamental wave of a wavelength conversion light source, preferably, the reflection spectral bandwidth is set in a range of 0.1 nm (FWHM) or less, specifically, in a range of not smaller than 0.01 nm but not larger than 0.06 nm. The inventors have confirmed, in this invention, that the laser is stably self oscillated, in the case where the reflection band of the fiber grating 104 is 0.05 nm or less. In particular, the inventors have confirmed that the laser is advantageously stably self oscillated, in the case where the reflection band of the fiber grating 102 is 1 nm or larger, and the reflection band of the fiber grating 104 is 0.05 nm or smaller.

The inventors have also confirmed that the laser is advantageously stably self oscillated, in the case where the mode field diameter is not smaller than 8 μm but not larger than 13 μm with respect to laser light emitted from a rare earth element doped double clad fiber. One of the reasons is that the doped amount of the laser active material can be increased by an increase in the mode field diameter, even if the densities of rare earth element ions as the laser active material are equal to each other.

In the case where light from the fiber laser light source 100 is used as a fundamental wave used at a wavelength conversion light source, it is desirable to align the polarization direction of light from the fiber laser light source 100 with the polarization direction of single polarized light (linearly polarized light). A reason for adjusting into linearly polarized light is that only a polarized light component in a certain polarization direction is subjected to wavelength conversion by a wavelength conversion crystal in an SHG module. Subsequently, fundamental wave light is guided into the SHG module by a polarization maintaining optical fiber for propagating the emitted fundamental wave light of a wavelength near 1,064 nm to generate light of 532 nm wavelength by second harmonic generation.

In this embodiment, allowing incidence of light having a high intensity into the output-side fiber grating 104 (e.g. allowing incidence of light of 1 W-power into a fiber having a core diameter of not smaller than 5 μm but not larger than 10 μ) enables to shift the reflection center wavelength toward the short wavelength side or the long wavelength side depending on a change in the refractive index of the fiber grating 104.

Figure 2:
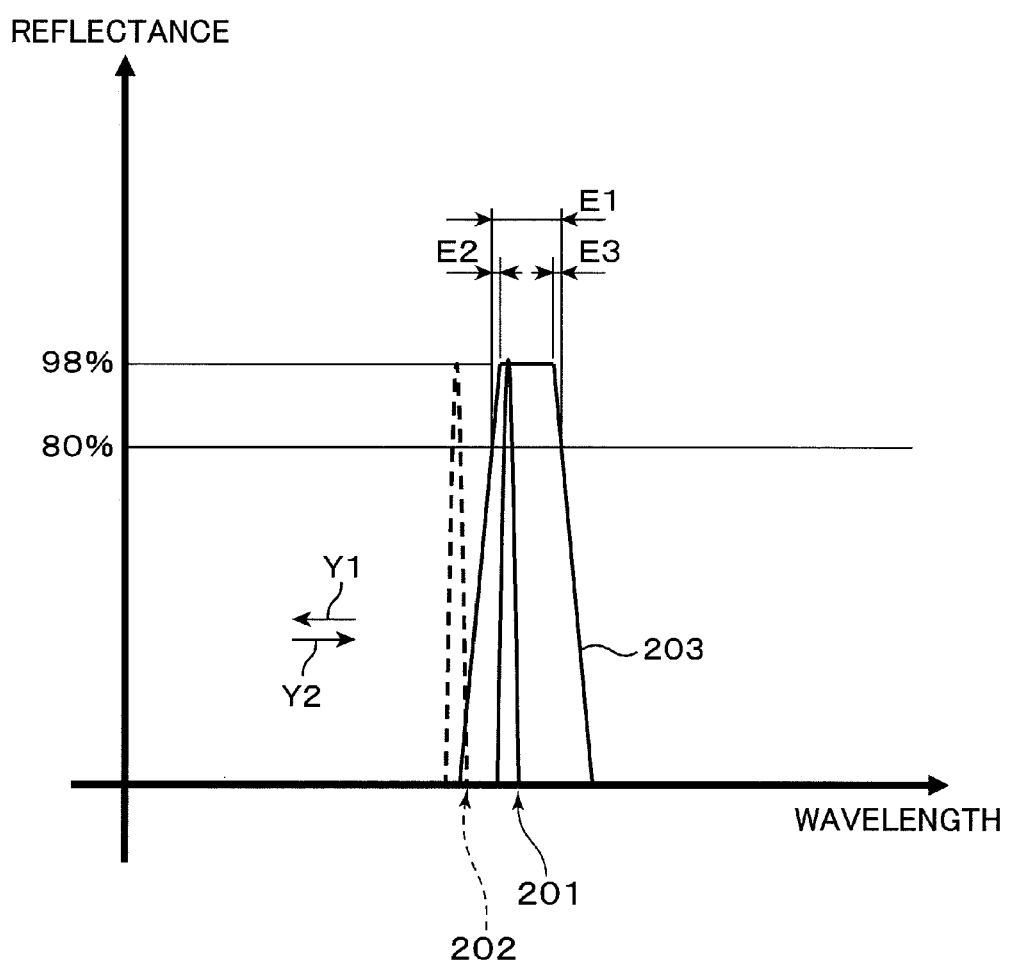
FIG. 2 is a plot diagram showing reflection bands of fiber gratings shown in FIG. 1.

FIG. 2 is a diagram showing a change in the reflection center wavelengths of the paired fiber gratings in this embodiment. FIG. 2 shows a reflection spectral profile 203 of the fiber grating 102, and a reflection spectral profile 201 of the fiber grating 104. For instance, the reflection spectral profile 201 is shifted toward a reflection spectral profile 202 on the short wavelength side in the direction of the arrow Y1 in response to incidence of light having a high intensity.

As described above, shifting the reflection center wavelength of the reflection spectral profile 201 to the reflection center wavelength of the reflection spectral profile 202 enables to reduce an overlap integration (an overlap portion) between the reflection band of the fiber grating 104, and the reflection band of the excitation-side fiber grating 102. For instance, as shown in FIG. 2, setting the reflection spectral profile 201 of the fiber grating 104 before shifting at such a position that the reflection spectral profile 201 is partly overlapped with the reflection spectral profile of the fiber grating 102 on the short wavelength side, and shifting the reflection spectral profile 201 to the reflection spectral profile 202 in the direction of the arrow Y1 toward the short wavelength side from the above state enables to reduce an overlap integration between the reflection band of the fiber grating 102 and the reflection band of the fiber grating 104.

A decrease in the overlap integration reduces the energy to be trapped in the fiber laser resonator, which lowers the peak output of the fundamental wave. As the trapped energy is reduced, the reflection center wavelength (the reflection spectral profile 202) of the fiber grating 104 is returned to the state (the reflection spectral profile 201) before the shifting in the direction of the arrow Y2 shown in FIG. 2. Accordingly, the peak output of the fundamental wave is increased again. Repeating the shift of the reflection center wavelength in the above-described manner enables to realize self pulse oscillation. The cycle of pulse oscillation is determined by the resonator length i.e. the fiber length (namely, the resonator length of a laser resonator) from the center position of the excitation-side fiber grating 102 to the center position of the exit-side fiber grating 104. In this embodiment, since the fiber length is set to about 10 m, the cycle of pulse oscillation is set to about 100 ns.

It is necessary to dope an element such as zinc (Pb), tin (Sn), antimony (Sb), bismuth (Bi), or germanium (Ge) into a core portion of a fiber constituted of the fiber grating 104 in order to obtain a characteristic that the reflection center wavelength is shifted depending on a light intensity (a characteristic that the optical refractive index is changed).

Further, it is necessary to overlap the reflection spectral profile of the fiber grating 102 having a wide wavelength band with the reflection spectral profile of the fiber grating 104 having a narrow wavelength band at a reflection spectral profile portion corresponding to a reflection band end where the reflectance of the fiber grating 102 is not smaller than 80% but not larger than 98% in order to increase the change amount of the energy to be trapped in the fiber laser resonator.

In other words, it is necessary to set the reflection center wavelength of the fiber grating 104 in a wavelength range E1 of the fiber grating 102, where the reflectance is not smaller than 80% but not larger than 98%.

More preferably, the reflection center wavelength of the fiber grating 104 may be controlled to lie in a wavelength range E2 corresponding to a part of an ascending slope of the waveform in the right direction shown in FIG. 2, where the reflectance is not smaller than 80% but not larger than 98%, or in a wavelength range E3 corresponding to a part of a descending slope of the waveform in the right direction shown in FIG. 2, where the reflectance is not smaller than 80% but not larger than 98%.

The above arrangement enables to easily change the energy to be trapped, because slight shift of the reflection center wavelength (refractive index change) of the reflection spectral profile 201 causes shift of the reflection center wavelength of the reflection spectral 201 out of the relatively wide reflectance range of the fiber grating 104. Specifically, in the case where the reflection center wavelength of the fiber grating 102 lies in the wavelength range E2, the energy to be trapped can be changed by shifting the reflection center wavelength toward the short wavelength side in the direction of the arrow Y1 shown in FIG. 2. On the other hand, in the case where the reflection center wavelength of the fiber grating 102 lies in the wavelength range E3, the energy to be trapped can be changed by shifting the reflection center wavelength toward the long wavelength side in the direction of the arrow Y2 shown in FIG. 2. Shifting the reflection spectral profile 201 toward the short wavelength side or the long wavelength side may be determined depending on various conditions.

In the foregoing embodiment, the wavelength ranges E1 through E3 are defined, based on the premise that the reflectance is in a range of not smaller than 80% but not larger than 98%. The upper limits of the wavelength ranges E1 through E3 are determined by the upper limit of the reflectance of the fiber grating 102. In other words, in the case where the fiber grating 102 having a reflectance of 99% is used, the wavelength ranges E1 through E3 are determined based on the premise that the reflectance is in a range of not smaller than 80% but not larger than 99%.

Second Embodiment

In the arrangement recited in the first embodiment, a optical output waveform may include a direct current component. In the second embodiment, described is a method for reducing a direct current component by modulating pump light in accordance with the cycle of pulse oscillation of a fundamental wave. FIGS. 3A through 3C are plot diagrams each showing a comparison between a optical output of pump light, and an output waveform of emitted fundamental wave light. FIG. 3A shows a relation between the output of continuously oscillated pump light, and the output of a fundamental wave, in the case where a laser is self oscillated merely by shift of the reflection center wavelength (refractive index change) of the output-side fiber grating 104 depending on the output of pump light.

As shown in FIG. 3A, in the case where pump light is continuously oscillated, the fundamental wave of the cycle P1 (e.g. 100 ns) is subjected to pulse oscillation resulting from a change in the refractive index of the fiber grating 104. In performing the above operation, the optical output of the fundamental wave includes a direct current component (a value (basal value) other than a peak in FIG. 3A). As shown in FIG. 3B, the cycle P1 of the fundamental wave and the cycle P2 of pump light can be made equal to each other by modulating the output of pump light by a pumping LD 101 at 10 MHz corresponding to the cycle P1. Thus, matching the self oscillation cycle P1 of the fundamental wave, and the cycle P2 of the pump light enables to reduce a direct current component in the output of the fundamental wave, as shown in FIG. 3B, in contrast to the diagram shown in FIG. 3A. The cycle P3 of the fundamental wave shown in FIG. 3B is equal to the cycle P1 of the fundamental wave shown in FIG. 3A.

Further, as shown in FIG. 3C, it is possible to reduce a direct current component in an output of a fundamental wave by a method, wherein pump light of a optical power equal to or smaller than an oscillation threshold value of a fiber laser is oscillated at the cycle P2, and pulse-like pump light having a optical power exceeding the oscillation threshold value is generated at the cycle P4, which is an integral multiple of the cycle P2. Specifically, for instance, it is possible to oscillate pump light of a optical power equal to or smaller than the oscillation threshold value of the fiber laser at the cycle P2 of 100 ns, and generate pump light having a optical power exceeding the oscillation threshold value at the cycle P4 of 300 ns. The above arrangement enables to generate a small peak at the cycle P3 of 100 ns, and pulse-oscillate a fundamental wave whose largest peak is generated at the cycle P5 equal to the cycle P4.

In the case where a wavelength conversion light source incorporated with the fiber laser light source is used as a light source for a display device to display a full color image using a DMD (digital micro-mirror device) and a modulation element as a space modulation element, if red light, green light, and blue light are successively emitted at a cycle of 60 Hz, a so-called color breaking phenomenon that the human eye perceives the colors as individually separate colors may occur, which may deteriorate the image quality. In view of the above, it is a general practice to drive a device at a multiple times speed. Generally, a projector for data display is driven from at a 6-times speed (360 Hz) to a 12-times speed (720 Hz), and a rear projection display is driven from at a 36-times speed (2,160 Hz) to a 48-times speed (2,880 Hz). Considering a case of adding a light control function to enhance the contrast in accordance with the driving at a multiple times speed, as an application in a display device, it is necessary to emit light at a speed eight times higher than the speed of the above case, in other words, at about 3 kHz in case of driving at a 6-times speed, and at about 25 kHz or more in case of driving at a 48-times speed, in order to change the brightness in 8-stages (8-bits). Since an increase in the bit number enables to realize smooth optical power control, it is preferable to secure the resolution of 8-bits or more. In view of the above, it is desirable to set the pulse cycle to not smaller than 20 Hz but not larger than 10 MHz in incorporating the inventive fiber laser in a display device.

Third Embodiment

In the third embodiment, described is an arrangement, wherein pulse oscillation can be performed by forming ripples in a reflection band of the fiber grating even if the refractive index of a fiber grating portion is slightly changed. The arrangement in the third embodiment is basically the same as the arrangement shown in FIG. 2. Specifically, a fiber laser light source 100 includes a double clad polarization maintaining fiber 103 (in this embodiment, the fiber length is set to 20 m) doped with Yb as a rare earth element into a core portion, a pumping LD 101 which emits pump light into the fiber 103, and a laser resonator including a pair of fiber gratings 102 and 104 optically connected to the fiber 103 in a state that the fiber 103 is interposed between the paired fiber gratings 102 and 104.

The fiber laser light source 100 is constructed in such a manner that the fiber 103 is excited by the pumping LD 101 to emit laser light (a fundamental wave) within a resonator constituted of the paired fiber gratings 102 and 104. A single-emitter laser diode (a diode having a maximum output of 20 W) having an oscillation wavelength of 975 nm is used as the pumping LD 101. A Yb-doped double clad polarization maintaining fiber is used as the fiber 103. Laser oscillation at 1,064 nm is realized by determining the reflection wavelengths of the fiber gratings 102 and 104. The fiber grating 102 is formed in a core portion of a germanium-doped double clad polarization maintaining fiber. The fiber grating 102 has a characteristic that the center wavelength is 1,064 nm, the reflection spectral half bandwidth is 1.5 nm, and the peak reflectance is 98%.

Figure 4:
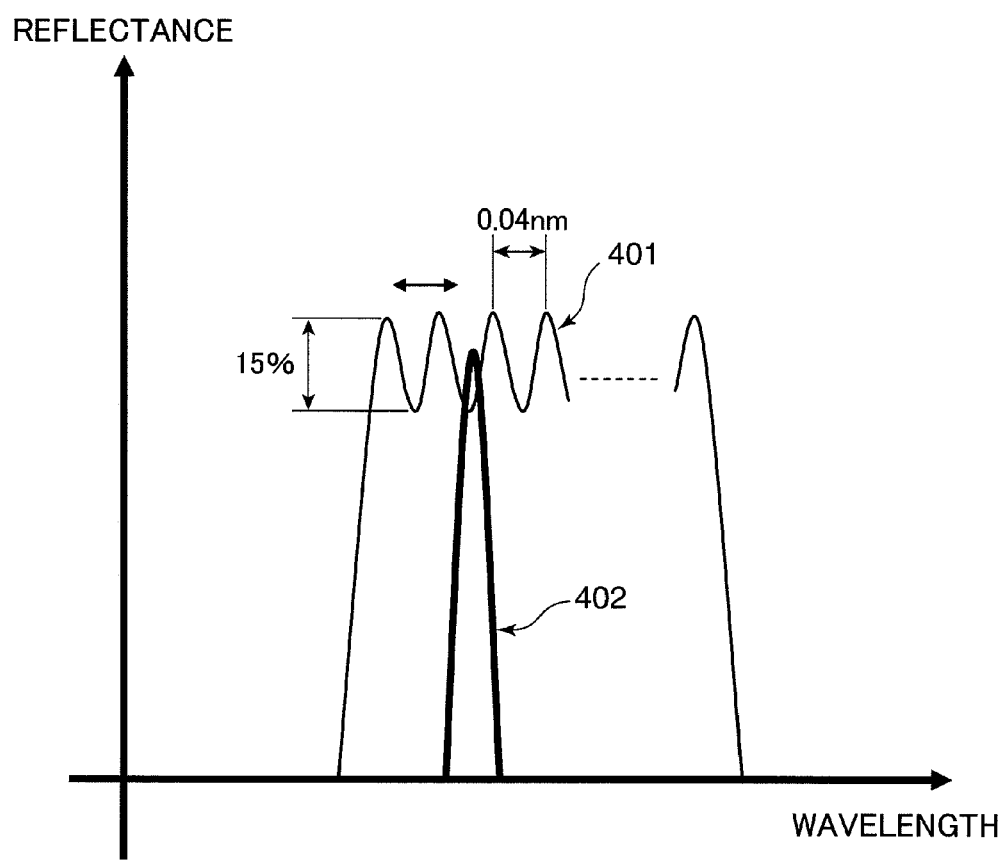
FIG. 4 is a plot diagram showing reflection bands of fiber gratings in a third embodiment of the invention.

FIG. 4 is a diagram showing reflection spectral profiles of the fiber gratings in the third embodiment. In FIG. 4, the reference numeral 401 indicates a reflection spectral profile of the fiber grating 102, and the reference numeral 402 indicates a reflection spectral profile of the fiber grating 104. The depth of the ripples of the fiber grating 102 is 15%, and the interval between the ripples is about 0.04 nm. The fiber grating 104 is formed in a core portion of a general germanium-doped single mode polarization maintaining fiber (core diameter: 6 μm, outer size of a clad portion: 125 μm), and has a characteristic that the center wavelength is 1,064 nm, the reflection spectral half bandwidth is 0.04 nm, and the reflectance is 15%.

The third embodiment is different from the first embodiment in that the reflection center wavelength of the fiber grating 102 is shifted by incidence of light having a high intensity into the fiber grating 102. A shift of the reflection center wavelength of the fiber grating 102 reduces an overlap integration with the reflection band of the output-side fiber grating 104. Specifically, the energy to be trapped in the fiber laser resonator is reduced, and the peak output of the fundamental wave is lowered. As the energy to be trapped is reduced, the reflection center wavelength of the fiber grating 102 is returned to the state before the shift. Accordingly, the peak output of the fundamental wave is increased again. Repeating the shift of the reflection center wavelength in the above-described manner enables to realize self pulse oscillation. The cycle of pulse oscillation is determined by the resonator length i.e. the fiber length from the center position of the excitation-side fiber grating 102 to the center position of the exit-side fiber grating 104. In this embodiment, since the fiber length is set to about 20 m, the cycle of pulse oscillation is set to about 200 ns. The above arrangement enables to obtain a self oscillation pulse fiber laser that enables to obtain a peak output of a fundamental wave of ten times of the output in using a CW (continuous wave) laser.

In this embodiment, the ripples in the fiber grating 102 occupy 15%. The invention is not limited to the above. For instance, the inventors confirmed that a peak output of a fundamental wave of 15 times of the output in using a CW laser can be obtained by setting the ratio of ripples with respect to the fiber grating 102 to 20%.

In this embodiment, there is no need of strictly matching the wavelengths between the excitation-side fiber grating 102 and the exit-side fiber grating 104 by forming ripples in the excitation-side fiber grating 102. This arrangement simplifies the construction, and enhances the industrial value.

Fourth Embodiment

Figure 5A:
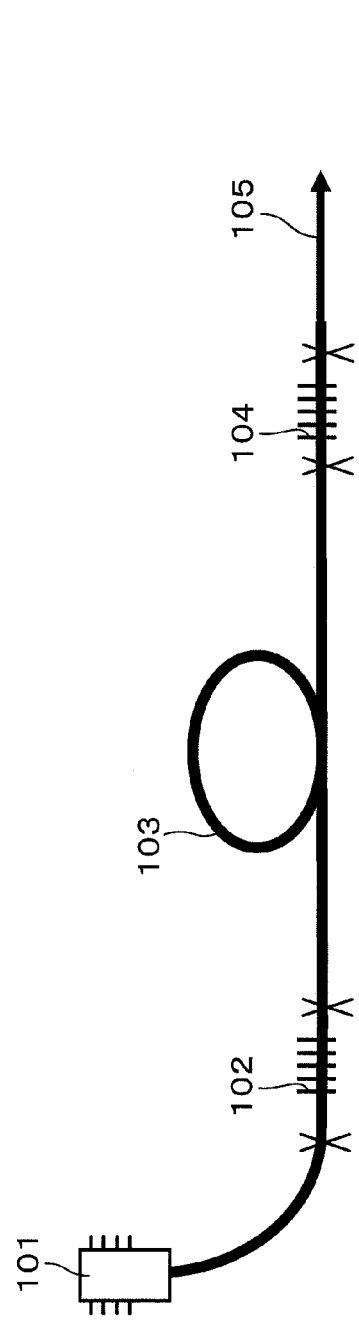
FIGS. 5A and 5B are construction diagrams showing a fiber for extending the resonator in a fourth embodiment of the invention.

In the fourth embodiment, described is an arrangement capable of obtaining pulse light having a larger peak output by increasing the resonator length. The arrangement in the fourth embodiment is substantially the same as the arrangement shown in FIG. 1. In the arrangement (see FIG. 5A) recited in the first embodiment, the cycle of pulse oscillation is determined by the resonator length. Specifically, it is possible to increase the cycle of pulse oscillation by increasing the length (resonator length) from the center position of an excitation-side fiber grating 102 to the center position of an exit-side fiber grating 104, wherein the excitation-side fiber grating 102 and the exit-side fiber grating 104 constitute a resonator. An increase in the cycle of pulse oscillation increases the energy to be trapped in the fiber laser resonator, and increases a peak output of pulse light to be emitted.

Figure 5B:
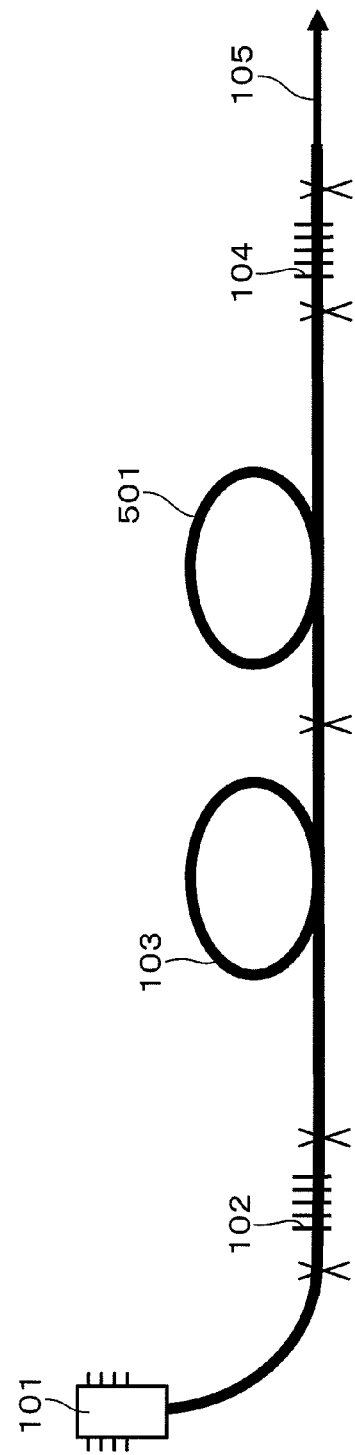
Figure 6A:
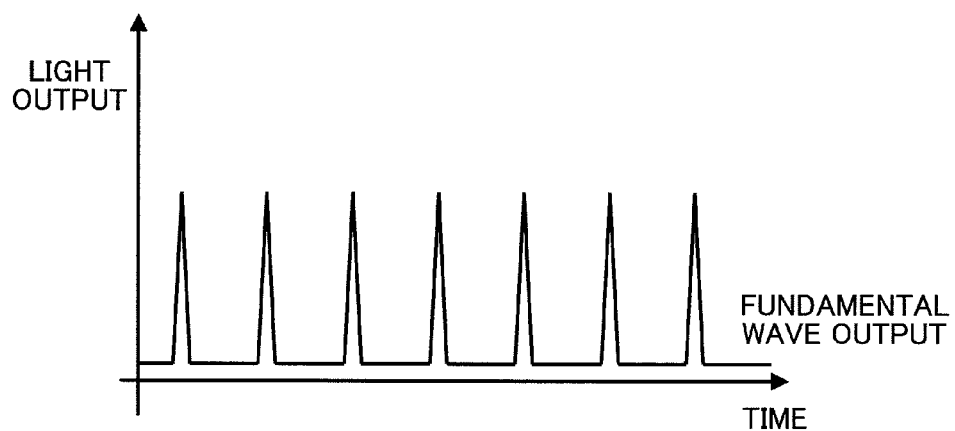
FIGS. 6A and 6B are plot diagrams showing that a pulse peak is increased by using the fiber for extending the resonator shown in FIGS. 5A and 5B.
Figure 6B:
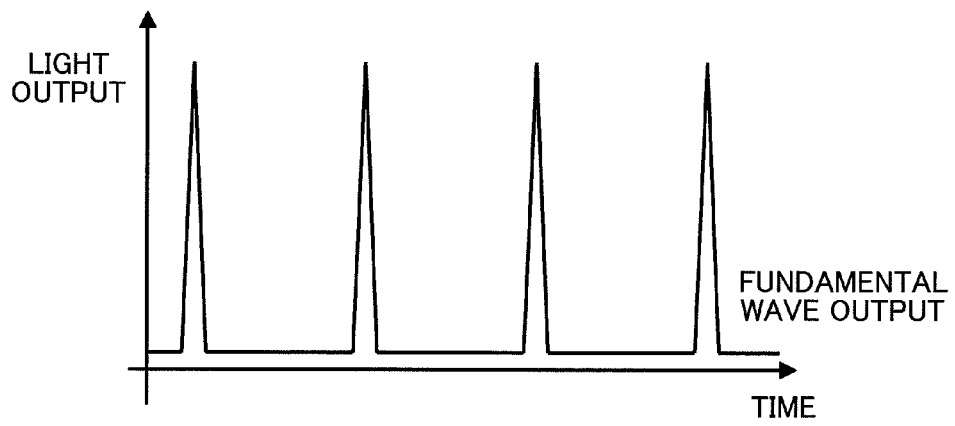

In view of the above, in this embodiment, as shown in FIG. 5B, a fiber for extending the resonator 501 is interposed between the fiber gratings 102 and 104, in addition to a fiber 103. This arrangement enables to increase the cycle of pulse light and the peak output of pulse light, as shown in FIG. 6B, as compared with a comparison example shown in FIG. 6A where the fiber for extending the resonator 501 is not provided. In this embodiment, single-emitter laser diodes (three diodes each having a maximum output of 6.5 W) having an oscillation wavelength of 915 nm are used as the pumping LD 101. The fiber grating 102 is formed in a core portion of a double clad polarization maintaining fiber, and has a characteristic that the center wavelength is 1,064 nm, the reflection spectral half bandwidth is 0.5 nm, and the reflectance is 99%. The fiber grating 104 is formed in a core portion of a general single-mode polarization maintaining fiber (core diameter: 10 μm, outer size of a fiber portion: 125 μm); and has a characteristic that the center wavelength is 1,064 nm, the reflection spectral half bandwidth is 0.05 nm, and the reflectance is 10%. The core diameter of the double clad polarization maintaining fiber 103 (e.g. NUFERN PM-YDF130/5) doped with Yb as a rare earth element into a core portion is set to 6 μm. The fiber length of the fiber 103 is set to 20 m so that the average output by operating a CW laser is maximized in an excitation condition that the pumping power of the pumping LD 101 is set to 19 W. The output under the above condition is 9.5 W. In the case where the fiber laser light source is pulse oscillated in the above condition, the peak output becomes 94 W, which is about 10 times of the average output during a CW operation. Further, in the case where the 20-meter extended fiber resonator 501 is inserted between the fiber gratings 102 and 104, the peak output becomes 190 W, which is about 20 times of the average output during the CW operation. Thus, the inventors have successfully obtained pulse light having a large peak output. It is desirable to use a polarization maintaining fiber without a laser active material, as the fiber for extending the resonator 501.

Fifth Embodiment

In the fifth embodiment, described is an arrangement capable of suppressing damage of a fiber grating as a component of a fiber laser resonator by the power of light. The arrangement in the fifth embodiment is substantially the same as the arrangement shown in FIG. 1. Since a fiber laser light source 100 in this embodiment is pulse operated, the light power density is increased both time-wise and space-wise, as compared with the CW operation. In particular, the light power density is likely to be increased, because incident light and reflection light are superimposed one over the other, resulting from a reflectance as high as near 100% of the excitation-side fiber grating 102. Accordingly, in the case where a laser is operated at a high output, a fiber grating as a component of a fiber laser resonator may be damaged by the power of light.

Figure 8:
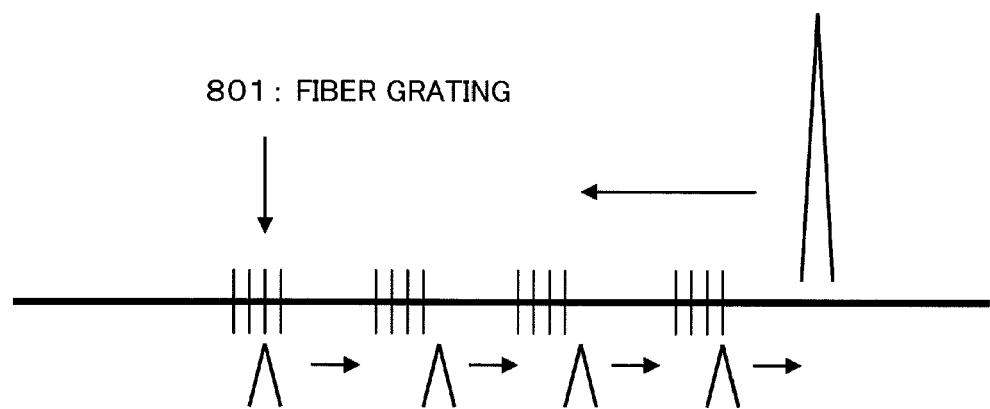
FIG. 8 is a schematic diagram showing an arrangement, wherein the fiber grating having the wide wavelength band in the fifth embodiment of the invention is formed into a sampled fiber grating structure.

In view of the above, in this embodiment, as shown in FIGS. 7A and 7B, a fiber having a large mode field diameter (diameter) 703 is used, as a fiber constituted of a fiber grating to suppress the damage. Specifically, it is possible to space-wise reduce the light power density to about one-fourth by setting the mode field diameter 703 to not smaller than 8 μm (see FIG. 7A) but not larger than 13 μm (see FIG. 7B). In the case where the mode field diameter of a fiber containing a laser active material is not smaller than 8 μm but not larger than 13 μm, the mode field diameter of a fiber constituted of a fiber grating is optimally set to a value not smaller than 9 μm but not larger than 15 μm, considering splice loss. Alternatively, as shown in FIG. 8, it is possible to adopt a sampled fiber grating structure constituted of plural fiber gratings 801, as the excitation-side fiber grating 102. The modification enables to reduce the light power density per fiber grating, because light is reflected at plural positions.

In the first through the fourth embodiments, a laser having a wavelength of 915 nm and a wavelength of 976 nm is used as the pump laser light source for a fiber laser. However, it is desirable to use a laser having a wavelength of 976 nm to efficiently excite a fiber laser. The inventors have found that the temperature characteristic of a fiber laser may be deteriorated, because a Yb-doped fiber has a narrow absorption spectrum band with respect to light of a wavelength of 976 nm and the oscillation wavelength of the semiconductor laser varies depending on an ambient temperature or a supply current. In order to avoid the above drawback, preferably, the fiber laser light source in this embodiment includes a fiber containing a laser active material, a pump laser light source which emits pump light into the fiber, and a laser resonator including a pair of fiber gratings optically connected to the fiber in a state that the fiber is interposed between the paired fiber gratings, wherein the oscillation center wavelength of the pump laser light source is shifted toward the long wavelength side, and the output of the pump laser light source is lowered, as the temperature is raised, and the length of the fiber containing the laser active material is set to not smaller than 1.5 times but not larger than 2 times of the length of a fiber which absorbs 95% or more of light of an absorption peak wavelength of the fiber containing the laser active material.

Figure 9:
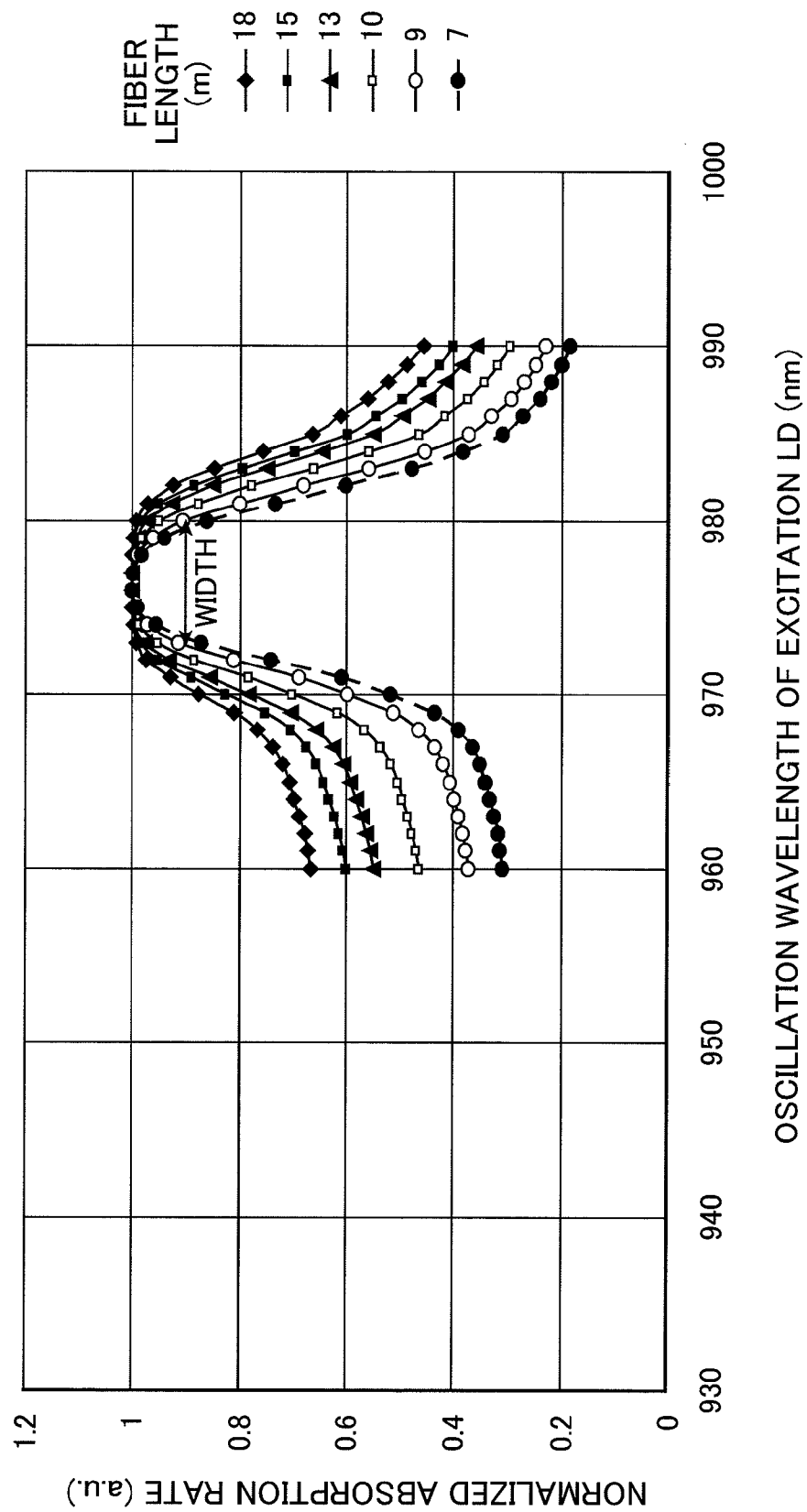
FIG. 9 is a plot diagram showing an absorption rate of an excitation wavelength, using the fiber length as a parameter.

FIG. 9 is a plot diagram showing a relation between an absorption rate and a wavelength of pump light, using the fiber length as a parameter. FIG. 9 shows a case where Yb-doped double clad polarization maintaining fiber (e.g. NUFERN PM-YDF130/5) having a mode field diameter of 6 μm is used as a fiber. In the following, comparison is made between the wavelength widths (hereinafter, called as allowable wavelength widths of pump light) where the absorption rate is set to 90% of a peak value, with respect to the fibers having the respective fiber lengths. As is obvious from the plot diagram of FIG. 9, the inventors have found that in the case where the wavelength of pump light is locked at 976 nm, and a Yb-doped fiber which has an optimal length (hereinafter, called as an optimal length) of 9 m and absorbs 95% or more of light of the absorption peak wavelength of the Yb-doped fiber is used at an ambient temperature of 25° C., the allowable wavelength width of pump light is about 6 nm. Further, in the case where a Yb-doped fiber having a fiber length of 15 m, which is about 1.5 times of the optimal length of the Yb-doped fiber, is used, the allowable wavelength width of pump light is about 12 nm, which is two times of the allowable wavelength width of pump light in the case where the 9 m-Yb-doped fiber is used. Furthermore, in the case where a Yb-doped fiber having a fiber length of 18 m, which is two times of the optimal length of the Yb-doped fiber, is used, the allowable wavelength width of pump light is about 14 nm, which is not greatly changed from the case where the fiber length of the Yb-doped fiber is set to 1.5 times as long as the optimal length of the Yb-doped fiber. The above result shows that it is desirable to set the fiber length to not smaller than 1.5 times of the optimal length but not larger than 2 times of the optimal length in order to secure the allowable wavelength width of pump light.

Temperature characteristics of Yb-doped fibers were measured by changing the ambient temperature with respect to each of a fiber laser resonator incorporated with a Yb-doped fiber having the optimal length, and a fiber laser resonator incorporated with a Yb-doped fiber having the fiber length of 1.5 times of the optimal length.

Figure 10:
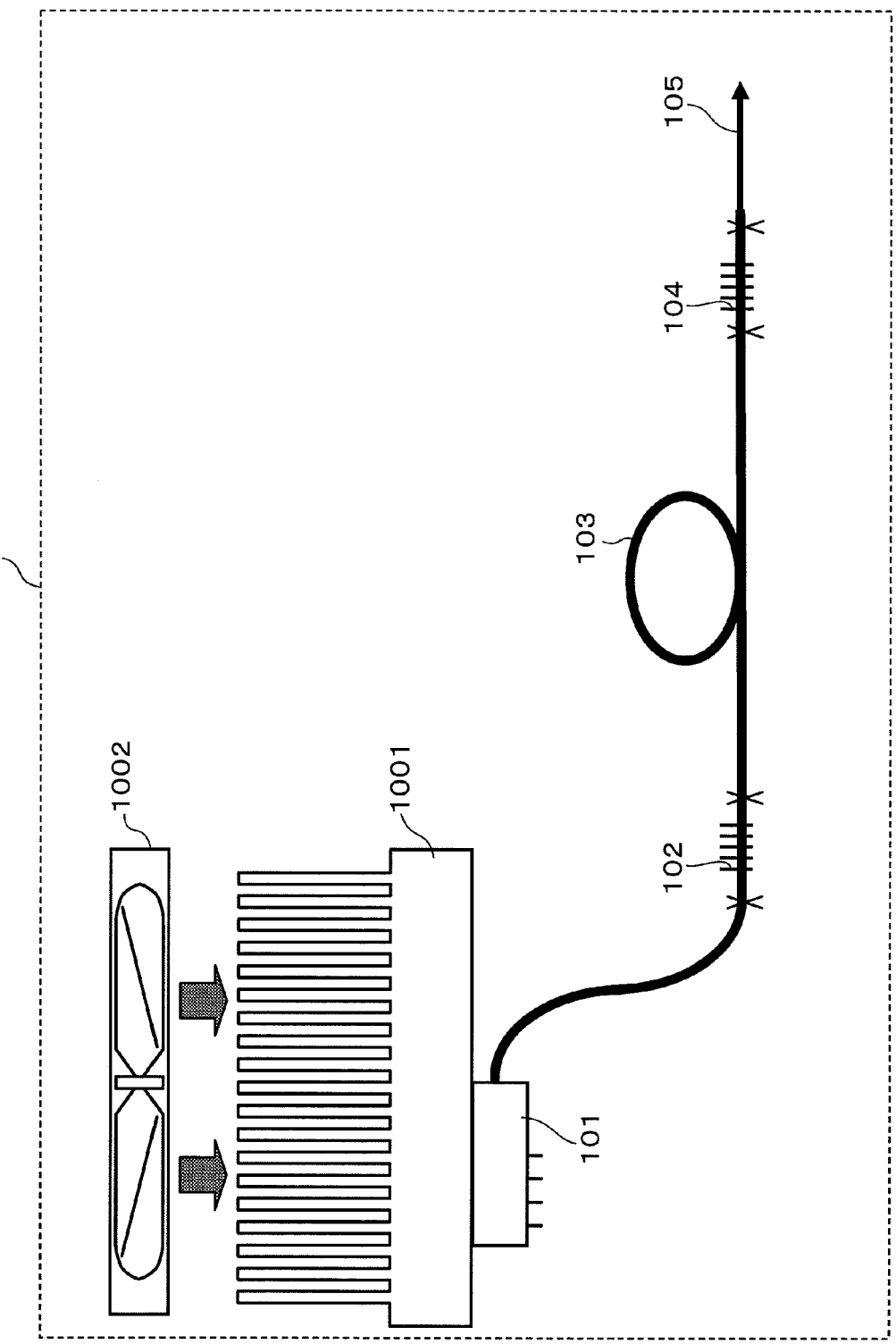
FIG. 10 is a schematic diagram showing an arrangement for use in measuring a temperature characteristic of a fiber laser.

FIG. 10 is a schematic diagram showing an arrangement in measuring a temperature characteristic of a fiber laser. A pumping LD 101 is fixedly attached to a heat sink 1001, and is forcibly air-cooled by a cooling fan 1002. As described above, the fiber laser resonator is constituted of the fiber gratings 102 and 104, and a Yb-doped fiber. All these components are immersed in a temperature-controlled bath, and the temperature characteristics of these components are measured in a state that the ambient temperature is freely changed.

Figure 11:
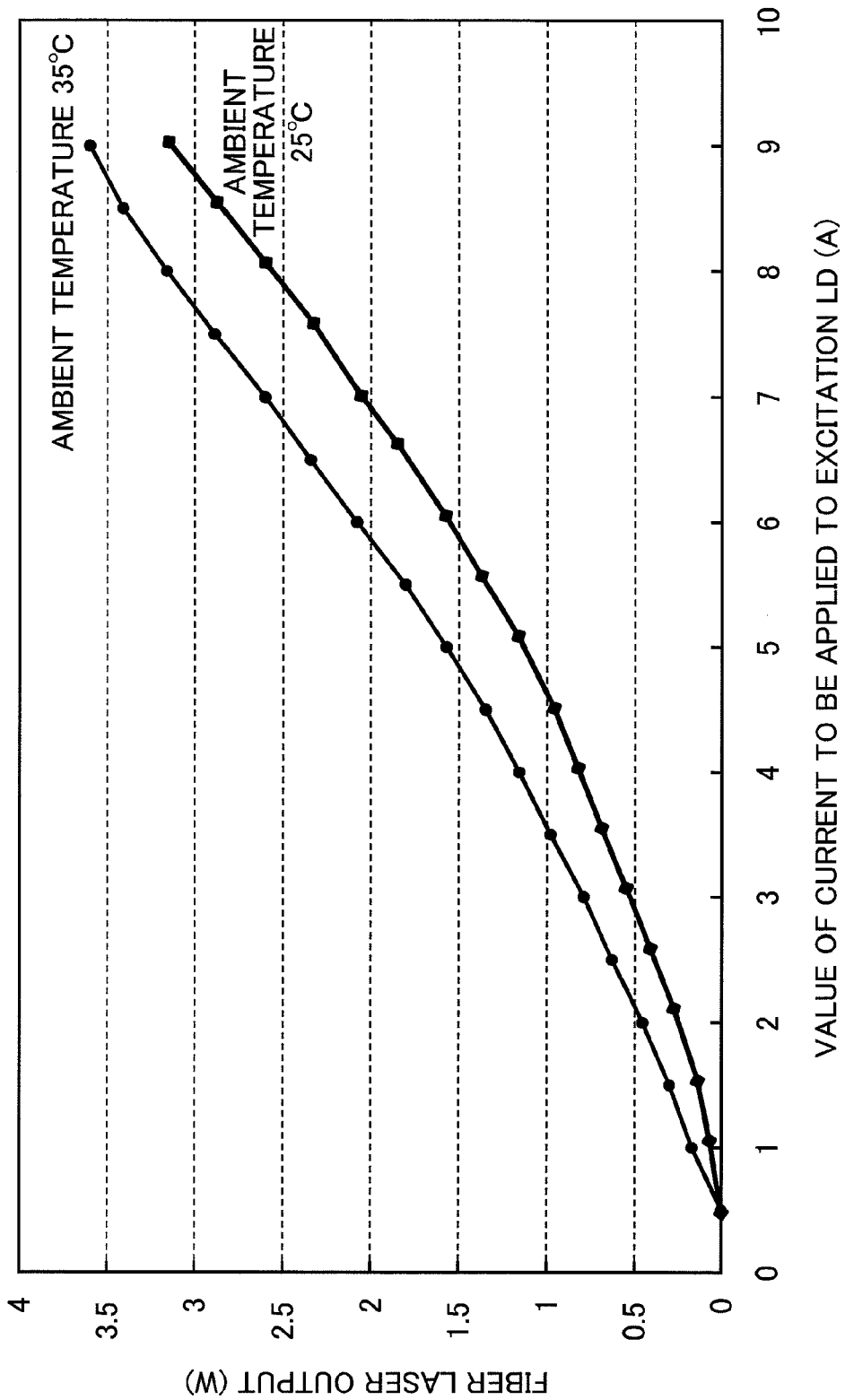
FIG. 11 is a plot diagram showing a temperature characteristic of a fiber laser output, in the case where the wavelength of pump light is set to 973 nm.
Figure 12:
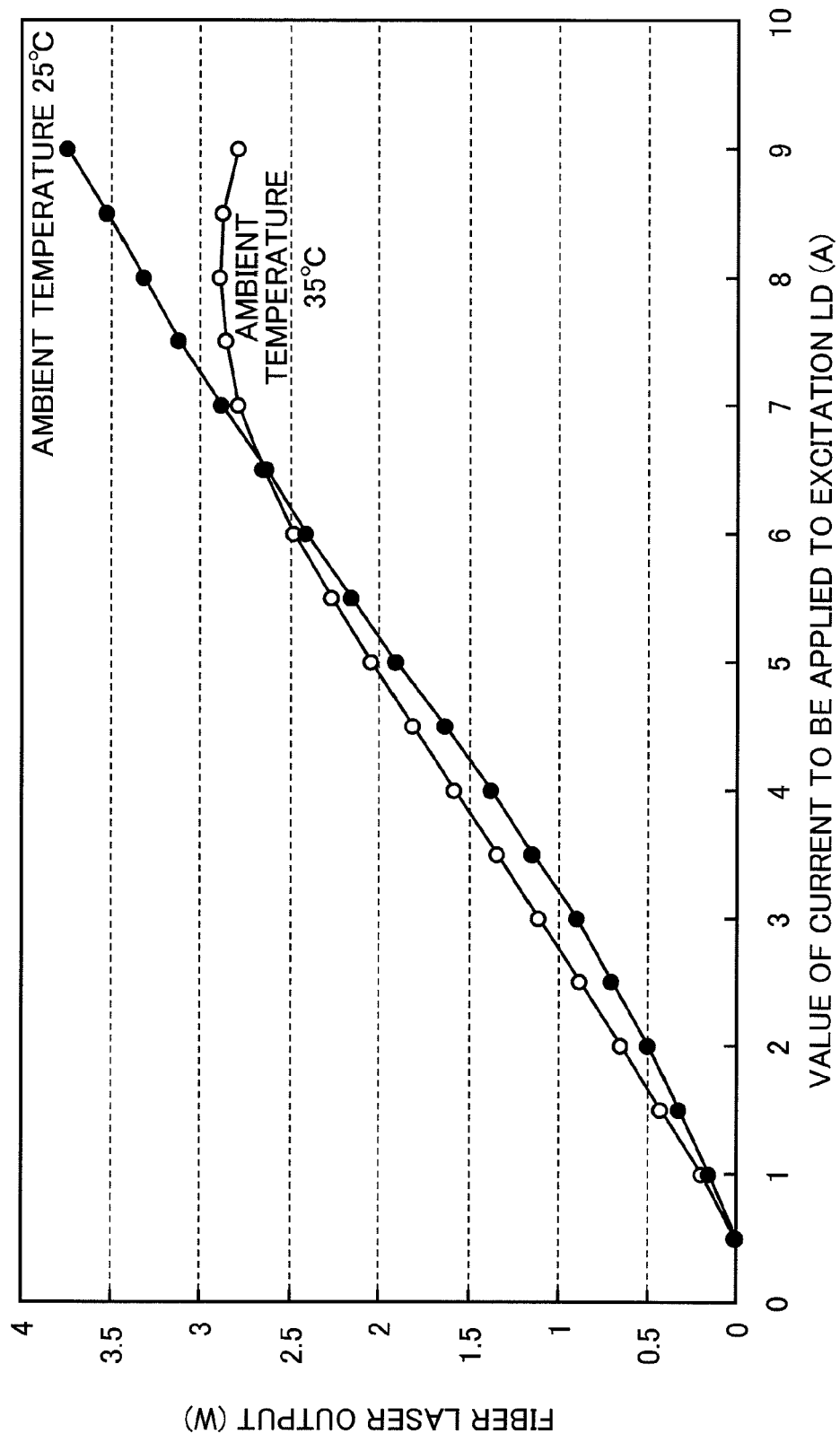
FIG. 12 is a plot diagram showing a temperature characteristic of a fiber laser output, in the case where the wavelength of pump light is set to 977 nm.

FIGS. 11 and 12 show outputs of a fiber laser with respect to a value of a current to be applied to the pumping LD, which is measured under various environmental temperature conditions, while setting the fiber length of the fiber laser to the optimal length. FIG. 11 shows values of a fiber laser output with respect to a value of a current to be applied to the pumping LD, in the case where the fiber length of the fiber laser is set to the optimal length, and the oscillation wavelength of the pump laser (pumping LD) is set to 973 nm (ambient temperature: 25° C., supply current: 9 A, output: 7 W). In the case where laser light having an oscillation wavelength of 973 nm on the short wavelength side is used as pump light, with respect to 976 nm as an absorption peak wavelength of the Yb-doped fiber, the value of the fiber laser output tends to increase, because the oscillation wavelength of the pump laser is increased, as the ambient temperature is raised. Whereas 3.2 W-output can be obtained at an ambient temperature of 25° C., 3.6 W-output can be obtained at an ambient temperature of 35° C. In other words, the maximum output value is varied depending on the ambient temperature. Conversely, FIG. 12 shows values of a fiber laser output with respect to a value of a current to be applied to the pumping LD, in the case where the oscillation wavelength is set to 977 nm on the long wavelength side (ambient temperature 25° C., supply current: 9 A, output: 7 W). As shown in FIG. 12, although 3.8 W-output can be obtained at an ambient temperature of 25° C., the output is lowered to 3 W or less at an ambient temperature of 35° C., which shows that there is no further improvement on the temperature characteristic. In other words, in use of the Yb-doped fiber having the optimal length, further improvement on the temperature characteristic cannot be obtained, if the oscillation wavelength of the pumping LD is other than 976 nm in any case.

Figure 13:
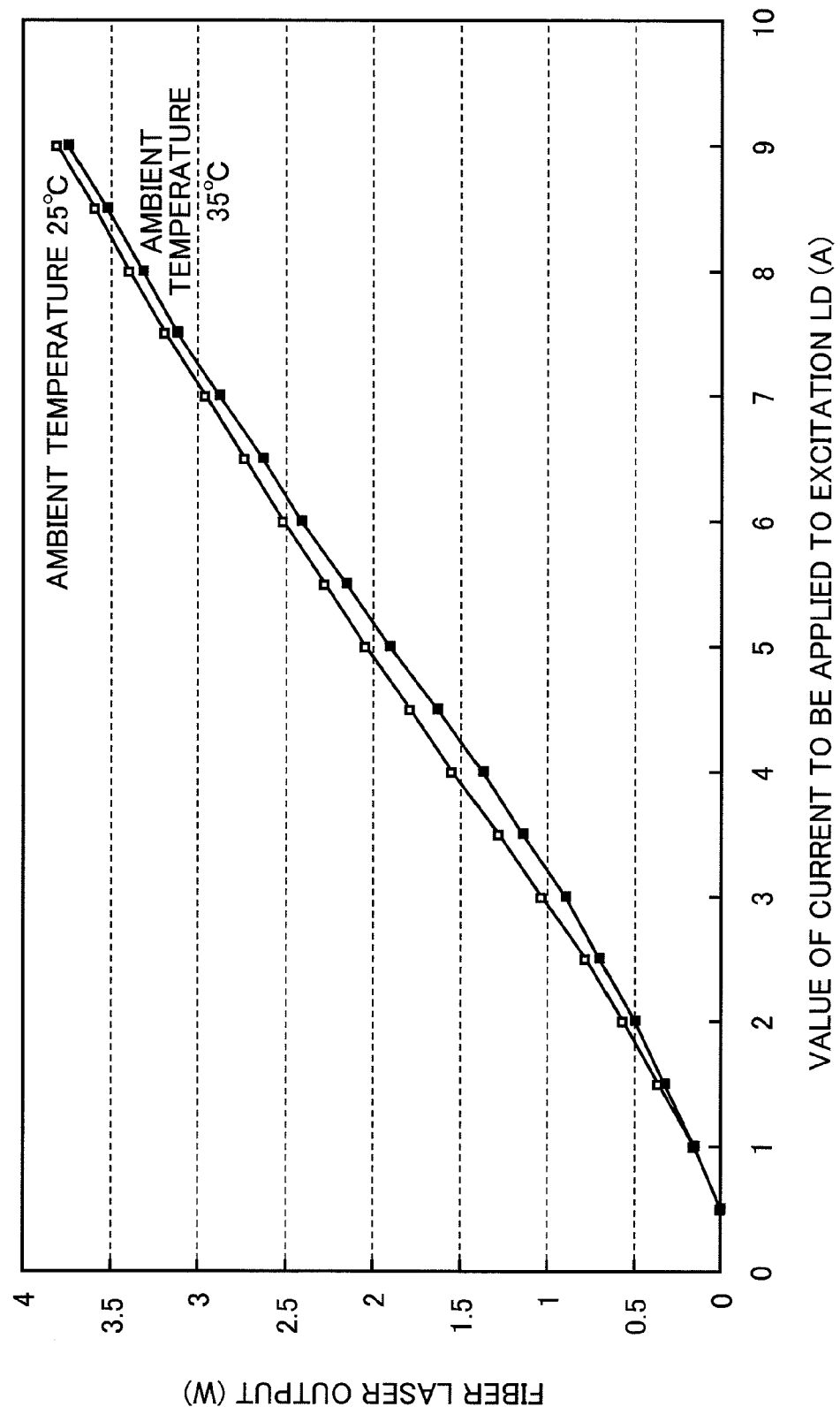
FIG. 13 is a plot diagram showing a temperature characteristic of a fiber laser output in an embodiment of the invention.

FIG. 13 shows values of a fiber laser output with respect to a value of a current to be applied to the pumping LD, in the case where the fiber length of the Yb-doped fiber is set to 15 m, which is 1.5 times of the optimal length. FIG. 13 shows a case that the oscillation wavelength of the pump laser is set to 977 nm. As shown in FIG. 13, 3.8 W-output can be obtained at an ambient temperature of 25° C., and 3.75 W-output can be obtained at an ambient temperature of 35° C., which shows that an output variation resulting from a temperature change can be suppressed to 2% or less. The above comparison has been made by exciting with the use of a semiconductor laser whose oscillation wavelength is not smaller than 970 nm but not larger than 980 nm. In any case, it is possible to set the output variation to 5% or less, which shows that an effect of improving a temperature characteristic is obtained. In the case where the oscillation wavelength of a semiconductor laser light source for use in excitation is not smaller than 970 nm but not larger than 976 nm, it is possible to suppress output lowering resulting from a change in the ambient temperature by improving the absorption rate of pump light to be emitted into the fiber doped with Yb, in the case where the value of a current to be applied to a laser diode is fixed. Thus, an output variation depending on a temperature can be advantageously suppressed.

The above arrangement enables to realize a pulse light source usable in an environment having a temperature range from the room temperature (e.g. about 20° C. or 25° C.) to about 40° C. or 50° C., merely by forcible air-cooling by a heat sink and a cooling fan, without the need of a cooling mechanism such as a Peltier element, which has been required in using a semiconductor laser having a 976 nm wavelength band.

In the first through the fifth embodiments, a fiber doped with Yb as a rare earth element is used, as the fiber 103. Alternatively, other rare earth element(s), for instance, a rare earth element of at least one kind selected from the group consisting of Nd, Er, Dy, Pr, Tb, and Eu may be used. Further alternatively, the doped amount of the rare earth element may be changed, or plural kinds of rare earth elements may be doped, depending on the oscillation wavelength and/or the output.

Figure 14:
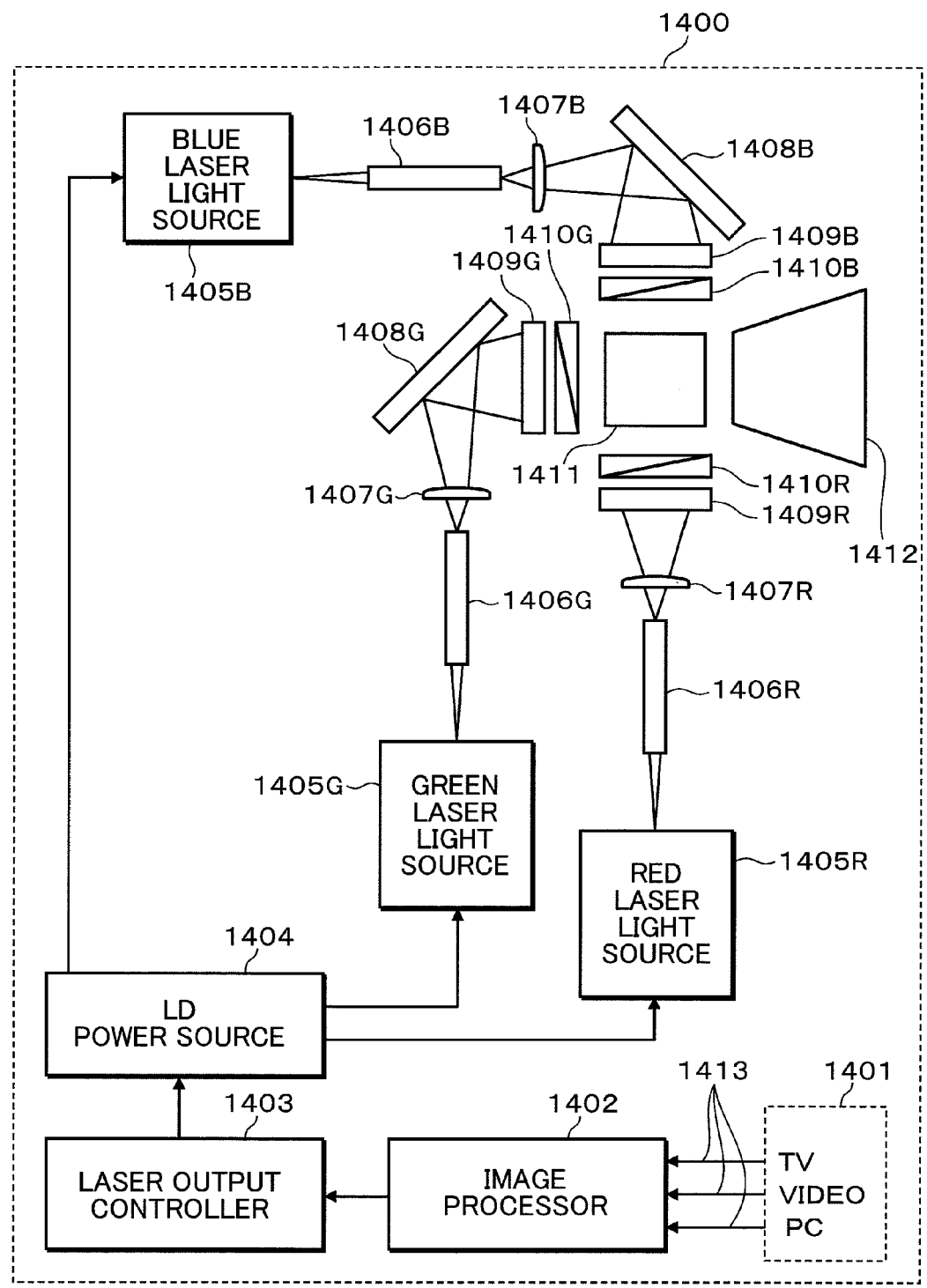
FIG. 14 is a schematic diagram showing an example, wherein any one of the fiber laser light sources in the first through the fifth embodiments of the invention is incorporated in an image display device.

FIG. 14 is a schematic diagram showing an optical engine of a projector system incorporated with a fiber laser light source, as proposed in this invention.

A two-dimensional image display device 1400 in this embodiment is an example, wherein the fiber laser light source is incorporated in an optical engine of a three-panel liquid crystal projector. Specifically, the two-dimensional image display device 1400 includes an image processor 1402, a laser output controller (controller) 1403, an LD power source 1404, red, green, and blue laser light sources 1405R, 1405G, and 1405B, beam forming rod lenses 1406R, 1406G, and 1406B, relay lenses 1407R, 1407G, and 1407B, bending mirrors 1408G and 1408B, two-dimensional modulators 1409R, 1409G, and 1409B for displaying an image, polarizers 1410R, 1410G, and 1410B, a dichroic prism 1411, and a projection lens 1412.

The green laser light source 1405G is controlled by the controller 1403 for controlling the output of the green laser light source 1405G, and the LD power source 1404. Specifically, the green laser light source 1405G includes the pulse fiber laser light source 100 (see FIG. 1), and a wavelength conversion element (not shown) for converting a fundamental wave emitted from the pulse fiber laser light source 100 into a harmonic.

Laser light from the respective light sources 1405R, 1405G, and 1405B are formed into a rectangular shape by the rod lenses 1406R, 1406G, and 1406B, and guided to the two-dimensional modulators 1409R, 1409G, and 1409B by the relay lenses 1407R, 1407G, and 1407B, respectively. The two-dimensional modulators 1409R, 1409G, and 1409B of the respective colors are illuminated with the laser light guided from the relay lenses 1407R, 1408G, and 1408B. Images of the respective colors, which have been two-dimensional modulated by the two-dimensional modulators 1409R, 1409G, and 1409B are combined by the dichroic prism 1411, and the combined image is projected onto a screen through the projection lens 1412. Thereby, the image is displayed on the screen.

The green laser light source 1405G is capable of suppressing an increase in the light loss of a resonator resulting from intrusion of dusts from the exterior or out of alignment of a reflection surface, because the laser resonator is used in a closed state within a fiber. This enables to suppress lowering of an output with time and/or output variation.

On the other hand, the image processor 1402 has a function of generating a optical power control signal for changing the output of laser light depending on luminance information on an image signal 1413 to be inputted, and transmitting the optical power control signal to the laser output controller 1403. Controlling the optical power depending on the luminance information enables to enhance the contrast.

In performing the above operation, it is possible to use a control method (PWM control), wherein a laser is pulse-driven, and an average optical power is changed by changing the duty ratio (the ratio of emission time/emission time+non-emission time) of the emission time of the laser.

Alternatively, green laser light in the wavelength range of from 510 nm to 550 nm may be emitted, as light of a wavelength to be emitted from a green laser light source for use in the projector system having the above configuration. The above arrangement enables to obtain green laser output light having a high luminosity, and provide a display device with enhanced color reproducibility to express colors analogous to the original colors.

In order to attain the above object, a two-dimensional display device of the invention may include a screen, a plurality of laser light sources, and a scanning section which scans the laser light sources, wherein the laser light sources are light sources for emitting at least red light, green light, and blue light, respectively, and at least a green light source, out of the laser light sources, is incorporated with any one of the above wavelength conversion devices.

In the above arrangement, since green laser output light having a high luminosity factor can be obtained, it is possible to express colors analogous to the original colors by using e.g. a display device having improved color reproducibility.

As described above, in the invention, there is used a method, wherein the Q-value in a resonator is controlled by changing a reflection characteristic of a reflection minor (fiber grating) constituting a resonator, in place of changing the light loss in a resonator depending on a light intensity, as means for pulse-oscillating a laser.

Specifically, the reflection characteristic of the fiber grating is changed by shifting the reflection center frequency by changing the optical refractive index.

It is also possible to use a control method, wherein pump light is emitted in accordance with the frequency for self oscillation to reduce a direct current component in a optical output waveform.

It is possible to lower the light power density by increasing the mode field diameter of the fiber, or forming the fiber grating into a sampled fiber grating structure to prevent damage of the fiber grating as a component of the fiber laser resonator.

In the fiber laser light source having the above arrangement, pulse oscillation can be performed without adding a part. This is advantageous in realizing e.g. a high-efficiency laser processing machine or a high-efficiency wavelength conversion light source.

In addition to the above, the above arrangement enables to prevent damage of a part, which has been a problem in realizing a pulse oscillation fiber laser light source. Thus, the above arrangement is advantageous in realizing a fiber laser light source having enhanced reliability.

The aforementioned embodiments mainly include the inventions having the following features.

A fiber laser light source according to an aspect of the invention includes a fiber containing a laser active material; a pump laser light source which emits pump light into the fiber; and a laser resonator including a pair of fiber gratings optically connected to the fiber in a state that the fiber containing the laser active material is interposed between the paired fiber gratings, wherein the laser resonator is configured to emit light of a single polarization by a polarization maintaining fiber and a single polarization mechanism, and the fiber laser light source has a wavelength characteristic that a reflection center wavelength of a laser-exit side fiber grating, out of the paired fiber gratings, lies in a wavelength range, where a reflectance of a fiber grating, out of the paired fiber gratings, closer to the pump laser light source is not smaller than 80% but not larger than 98%.

According to the invention, a self oscillation laser can be realized by changing the refractive index of one of the fiber gratings, and changing an overlap integration of reflection bands of the fiber gratings. The reason is as follows.

By incidence of light having a certain light intensity into one of the fiber gratings, the refractive index of the fiber grating is changed, and the reflection center wavelength of the fiber grating is changed depending on the change in the refractive index. Thus, changing the reflection center wavelength reduces an overlap portion of reflection bands of the fiber gratings, which reduces an energy to be trapped in the laser resonator, and lowers the peak output of laser light. Further, as the energy to be trapped is reduced, the reflection center wavelength of the fiber grating is returned to a state before the wavelength shift. Accordingly, the peak output of laser light is increased again. Thus, repeating the change in the reflection center wavelength in the aforementioned manner enables to realize self pulse oscillation.

In the fiber laser light source, preferably, a wavelength band of the fiber grating closer to the pump laser light source may be 1 nm or more, a wavelength band of the laser-exit side fiber grating may be 0.05 nm or less, and the laser resonator may emit pulse laser.

In the fiber laser light source, preferably, a mode field diameter of the fiber may be not smaller than 8 μm but not larger than 13 μm when the light generated in the laser resonator passes through the fiber containing the laser active material.

The above arrangements enable to stably perform self laser oscillation.

In the fiber laser light source, preferably, a portion of the fiber constituted of the laser-exit side fiber grating may be doped with a metal of one kind or more selected from the group consisting of zinc, tin, antimony, bismuth, and germanium, or a metal compound thereof.

Use of the aforementioned fiber as a fiber constituted of a fiber grating enables to obtain a fiber grating having a characteristic (a characteristic that the refractive index is changed) that the reflection center wavelength is changed depending on the light intensity.

In the fiber laser light source, preferably, a self oscillation cycle of the laser resonator which is determined by a resonator length of the laser resonator, and a light emission cycle of the pump laser light source may be set equal to each other.

In the above arrangement, a direct current component of laser light to be emitted from the laser resonator can be reduced.

In the fiber laser light source, preferably, ripples of a reflection band of the fiber grating having a wide wavelength band and closer to the pump laser light source, out of the paired fiber gratings, may occupy 15% or more.

In the above arrangement, even if the refractive index change of the fiber grating is significantly small, it is possible to change the overlap portion of reflection bands of the fiber gratings to thereby easily perform pulse oscillation. Further, the above arrangement enables to change the overlap portion of reflection bands in relation to the ripples. This enables to easily perform initial setting with respect to the reflection bands of the fiber gratings.

Preferably, the fiber laser light source may further include a fiber for extending the resonator inserted in the laser resonator.

The above arrangement enables to increase the cycle of pulse oscillation, and increase the peak output of pulse light.

In the fiber laser light source, preferably, a mode field diameter of a portion of the fiber constituted of a fiber grating having a wide wavelength band and closer to the pump laser light source, out of the paired fiber gratings, may be not smaller than 9 µm but not larger than 15 µm with respect to a reflection wavelength of the fiber grating.

In the above arrangement, it is possible to suppress deterioration of the fiber by reducing the light power density in the fiber constituted of the fiber grating. In particular, in the case where a fiber of a mode field diameter of not smaller than 8 µm but not larger than 13 µm is used as a fiber between laser resonators, it is possible to secure a sufficiently large mode field diameter, even if there occurs fusion connection loss between the fiber and the respective laser resonators.

In the fiber laser light source, preferably, the fiber grating having a wide wavelength band and closer to the pump laser light source, out of the paired fiber gratings, may have a sampled fiber grating structure.

In the above arrangement, since the sampled fiber grating structure formed by a plurality of fiber gratings is adopted, light is reflected at plural positions. This arrangement enables to reduce the light power density per fiber grating.

In the fiber laser light source, preferably, the pump laser light source may be so configured that an oscillation center wavelength thereof is shifted toward a long wavelength side, and an output thereof is lowered, as a temperature is raised, and the fiber containing the laser active material may have a fiber length of not smaller than 1.5 times but not larger than 2 times of a fiber length of a fiber which absorbs 95% or more of light having an absorption peak wavelength of the fiber containing the laser active material.

In the above arrangement, use of the laser active material containing fiber having a fiber length of not smaller than 1.5 times but not larger than 2 times of a fiber which absorbs 95% or more of light having an absorption peak wavelength of the laser active material containing fiber enables to expand the wavelength range of pump light, which is a requirement for allowing the laser active material containing fiber to absorb pump light at an absorption rate equal to or larger than a predetermined absorption rate. Accordingly, the above arrangement enables to suppress lowering of the absorption rate of pump light by the fiber, even if the wavelength of pump light to be emitted from the pump laser light source is changed depending on a change in the ambient temperature.

In the fiber laser light source, preferably, an oscillation wavelength of the pump laser light source at an ambient temperature of 25° C. may be not smaller than 970 nm but not larger than 980 nm.

The above arrangement enables to enhance the output of a laser. In particular, use of a fiber, whose fiber length is 1.5 times of the fiber length of a fiber which absorbs 95% or more of light having an absorption peak wavelength of the laser active material containing fiber, is advantageous in effectively suppressing an output variation resulting from a temperature change.

Preferably, the fiber laser light source may further include a heat sink and a cooling fan which cool the pump laser light source.

The above arrangement enables to realize a fiber laser light source usable in an environment having a temperature range from the room temperature (e.g. about 20° C. or 25° C.) to about 40° C. or 50° C. merely with forcible air-cooling by the heat sink and the cooling fan.

Industrial Applicability

According to the inventive fiber laser light source, since it is possible to obtain a pulse light source having high efficiency and a high peak power, the conversion efficiency of a laser application device itself can be enhanced by using the fiber laser light source for the purpose of laser processing, or using light from the fiber laser light source as a fundament wave at a wavelength conversion light source.

Further, since the temperature characteristic of the fiber laser light source can also be improved, the fiber laser light source is usable as a stable and high-efficiency pulse light source, even if the ambient temperature or a like condition is changed. In particular, there is no need of providing a cooling mechanism such as a Peltier element for cooling a pumping LD, and a pulse light source usable in an environment having a temperature range of from the room temperature (e.g. about 20° C. or 25° C.) to about 40° C. or 50° C. can be realized merely with forcible air-cooling by a heat sink and a cooling fan. Accordingly, it is possible to enhance the efficiency for converting a total electric power into a optical output.

What is claimed is:

1. A fiber laser light source comprising:
    a fiber containing a laser active material;
    a pump laser light source which emits pump light into the fiber; and
    a laser resonator including a pair of fiber gratings optically connected to the fiber in a state that the fiber containing the laser active material is interposed between the paired fiber gratings, wherein
    the laser resonator is configured to emit light of a single polarization by a polarization maintaining fiber,
    the fiber laser light source has a wavelength characteristic that a reflection center wavelength of a laser-exit side fiber grating, out of the paired fiber gratings, lies in a wavelength range, where a reflectance of a fiber grating, out of the paired fiber gratings, closer to the pump laser light source is not smaller than 80% but not larger than 98%
    a wavelength band of the fiber grating closer to the pump laser light source is 1 nm or more,
    a wavelength band of the laser-exit side fiber grating is 0.05 nm or less, and
    the laser resonator emits self oscillated pulse laser light by shifting a reflection center wavelength of the laser-exit side fiber grating depending on a change in a refractive index of the laser-exit side fiber grating in response to incidence of light into the laser-exit side fiber grating.

2. The fiber laser light source according to claim 1, wherein a mode field diameter of the fiber is not smaller than 8 µm but not larger than 13 µm when the light generated in the laser resonator passes through the fiber containing the laser active material.

3. The fiber laser light source according to claim 1, wherein a portion of the fiber constituted of the laser-exit side fiber grating is doped with a metal of one kind or more selected from the group consisting of zinc, tin, antimony, bismuth, and germanium, or a metal compound thereof.

4. The fiber laser light source according to claim 1, wherein
a self oscillation cycle of the laser resonator to be determined by a resonator length of the laser resonator, and a light emission cycle of the pump laser light source are set equal to each other.

5. The fiber laser light source according to claim 1, wherein
ripples of a reflection band of the fiber grating having a wide wavelength band and closer to the pump laser light source, out of the paired fiber gratings, occupy 15% or more.

6. The fiber laser light source according to claims 1, further comprising
a fiber for extending the laser resonator inserted in the laser resonator.

7. The fiber laser light source according to claim 1, wherein
a mode field diameter of a portion of the fiber constituted of a fiber grating having a wide wavelength band and closer to the pump laser light source, out of the paired fiber gratings, is not smaller than 9 µm but not larger than 15 µm with respect to a reflection wavelength of the fiber grating.

8. The fiber laser light source according to claim 1, wherein
the fiber grating having a wide wavelength band and closer to the pump laser light source, out of the paired fiber gratings, has a sampled fiber grating structure.

9. The fiber laser light source according to claim 1, wherein
the laser active material is Yb,
the pump laser light source is so configured that an oscillation center wavelength thereof is shifted toward a long wavelength side, and an output thereof is lowered, as a temperature is raised, and
the fiber containing the Yb laser active material has a fiber length of not smaller than 1.5 times but not larger than 2 times of a fiber length of a fiber which absorbs 95% or more of light having an absorption peak wavelength of the fiber containing the laser active material.

10. The fiber laser light source according to claim 1, wherein
an oscillation wavelength of the pump laser light source at an ambient temperature of 25° C. is not smaller than 970 nm but not larger than 980 nm.

11. The fiber laser light source according to claim 1, further comprising a heat sink and a cooling fan which cool the pump laser light source.

* * * * *